United States Patent
Smith

(10) Patent No.: US 6,890,001 B1
(45) Date of Patent: May 10, 2005

(54) ELONGATED INFLATOR DEVICE, ASSEMBLY AND METHOD OF USE

(75) Inventor: Bradley W. Smith, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 348 days.

(21) Appl. No.: 09/586,484

(22) Filed: Jun. 1, 2000

(51) Int. Cl.[7] ............................................. B60R 21/26
(52) U.S. Cl. ...................................... 280/736; 280/740
(58) Field of Search ............................ 230/736, 741, 230/730.2, 740

(56) References Cited

U.S. PATENT DOCUMENTS

| | | | |
|---|---|---|---|
| 4,005,876 A | * | 2/1977 | Jorgensen et al. .......... 280/741 |
| 4,158,696 A | * | 6/1979 | Wilhelm ..................... 280/736 |
| 4,200,615 A | * | 4/1980 | Hamilton et al. ........... 422/166 |
| 4,414,902 A | | 11/1983 | Strasser et al. |
| 4,696,705 A | | 9/1987 | Hamilton |
| 4,806,180 A | | 2/1989 | Goetz et al. |
| 4,817,828 A | | 4/1989 | Goetz |
| 4,878,690 A | * | 11/1989 | Cunningham ............... 280/741 |
| 5,005,486 A | | 4/1991 | Lenzen |
| 5,034,070 A | | 7/1991 | Goetz et al. |
| 5,048,862 A | | 9/1991 | Bender et al. |
| 5,051,143 A | | 9/1991 | Goetz |
| 5,066,038 A | | 11/1991 | Frantom et al. |
| 5,094,475 A | | 3/1992 | Olsson et al. |
| 5,109,772 A | | 5/1992 | Cunningham et al. |
| 5,398,966 A | * | 3/1995 | Hock ......................... 280/736 |
| 5,482,315 A | * | 1/1996 | Chandler, Jr. et al. ...... 280/741 |
| 5,499,843 A | | 3/1996 | Faigle et al. |
| 5,542,704 A | * | 8/1996 | Hamilton et al. ........... 280/741 |
| 5,547,638 A | * | 8/1996 | Rink et al. .................. 422/164 |
| 5,551,724 A | * | 9/1996 | Armstrong, III et al. ... 280/737 |
| 5,585,597 A | | 12/1996 | Faigle et al. |
| 5,743,556 A | * | 4/1998 | Lindsey et al. ............. 280/736 |
| 5,788,270 A | | 8/1998 | HÅland et al. |
| 5,845,933 A | * | 12/1998 | Walker et al. .............. 280/741 |
| 5,871,228 A | * | 2/1999 | Lindsey et al. .......... 280/728.2 |
| 6,051,158 A | * | 4/2000 | Taylor et al. ................. 252/67 |
| 6,068,290 A | * | 5/2000 | Sheng ........................ 280/736 |
| 6,073,961 A | * | 6/2000 | Bailey et al. ............ 280/730.2 |
| 6,145,876 A | | 11/2000 | Hamilton |
| 6,164,688 A | * | 12/2000 | Einsiedel et al. ........ 280/730.2 |
| 6,176,517 B1 | | 1/2001 | Hamilton et al. |

FOREIGN PATENT DOCUMENTS

WO     WO 90/09295     9/1989

* cited by examiner

*Primary Examiner*—Lesley D. Morris
*Assistant Examiner*—L. Lum
(74) *Attorney, Agent, or Firm*—Sally J. Brown

(57) ABSTRACT

An inflator such as for supplying inflation fluid to an inflatable vehicle occupant restraint is provided. Such an inflator includes an elongated hollow tubular member containing an elongated supply of pyrotechnic gas generant material reactable to produce a supply of gas. The tubular member has a length to diameter ratio greater than 20 and includes a plurality of longitudinally-spaced apart gas exit orifices wherethrough at least a portion of the supply of gas provided by reaction of the pyrotechnic gas generant material can be expelled from the tubular member. Also provided are associated or related inflation assemblies and methods for inflatable device inflation.

26 Claims, 7 Drawing Sheets

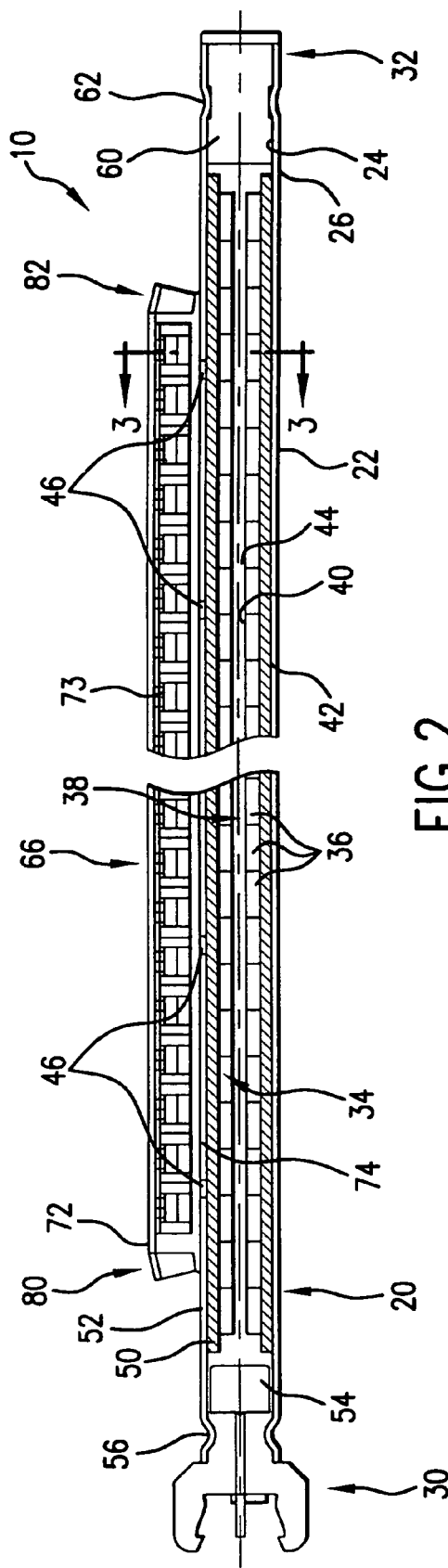
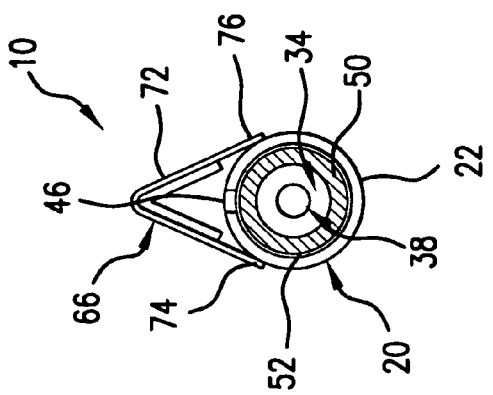

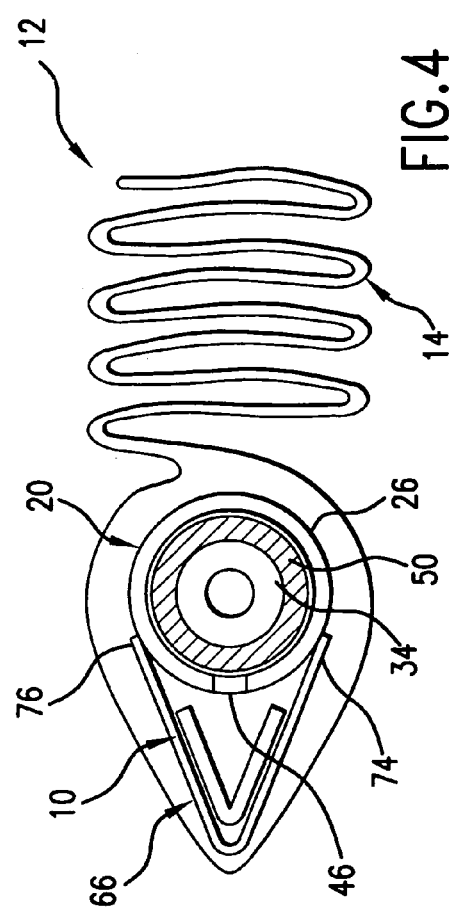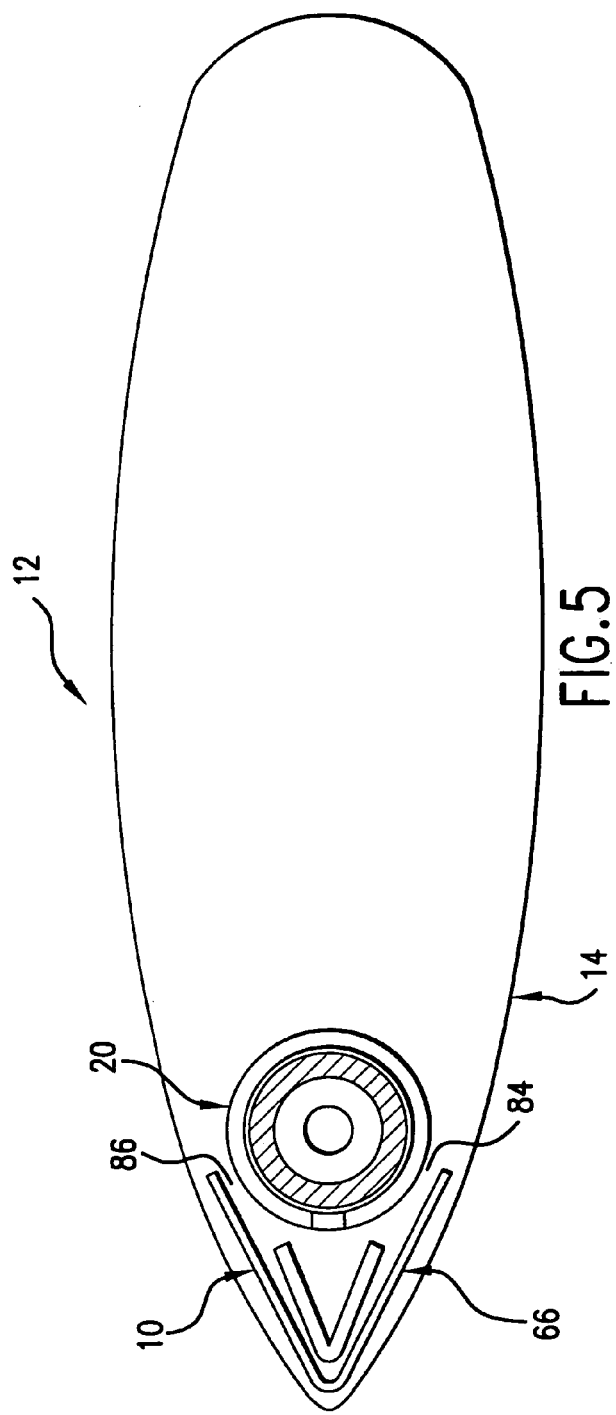

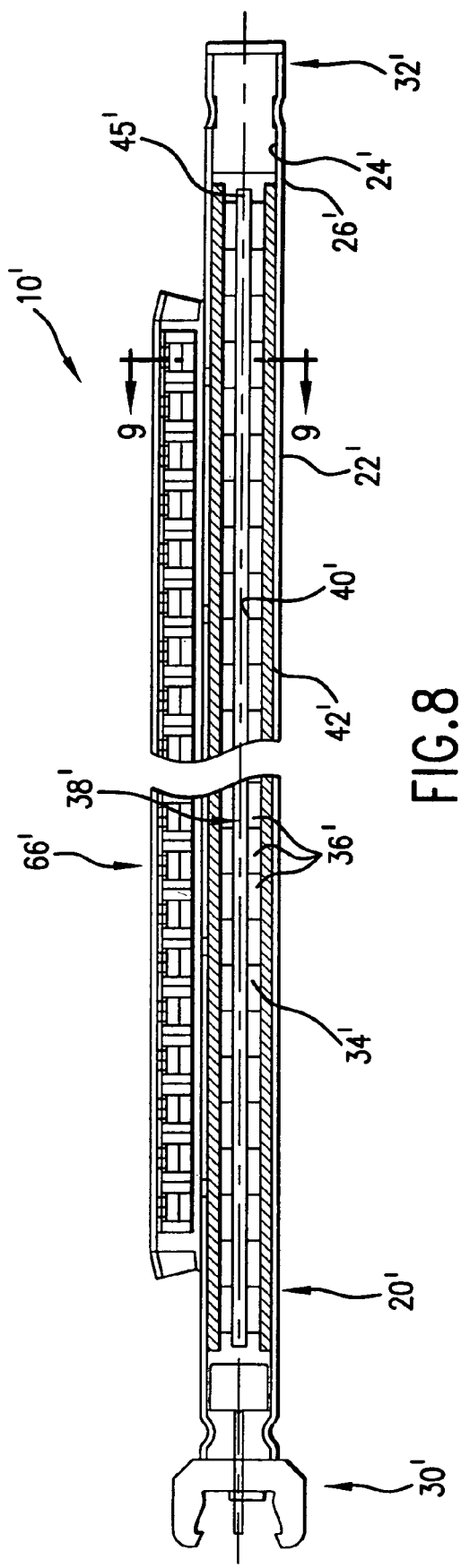
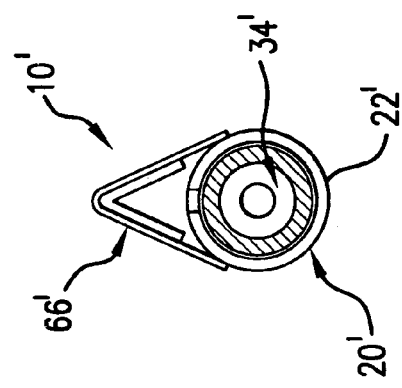

ELONGATED INFLATOR DEVICE, ASSEMBLY AND METHOD OF USE

BACKGROUND OF THE INVENTION

This invention relates generally to the providing or supplying of inflation gas and, more particularly, to the providing or supplying of such inflation gas via an elongated inflator such as may be desired for certain inflatable passive restraint systems for use in vehicles for restraining the movement of an occupant in the event of a vehicular collision.

It is well known to protect a vehicle occupant by means of safety restraint systems which self-actuate from an unemployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior.

Various types or forms of such passive restraint assemblies have been developed or tailored to provide desired vehicle occupant protection such as based on either or both the position or placement of the occupant within the vehicle and the direction or nature of the vehicle collision, for example. In particular, driver side and passenger side inflatable restraint installations have found wide usage for providing protection to drivers and front seat passengers, respectively, in the event of head-on types of vehicular collisions. Driver side and passenger side inflatable restraint installations do not, however, generally provide as great as may be desired protection against vehicular impacts inflicted or imposed from directions other than head-on, i.e., "side impacts." In view thereof, substantial efforts have been directed to developing inflatable restraint installations having particular effectiveness in the event of a side impact.

Upon deployment, the time period during which an airbag cushion remains pressurized is commonly referred to as "stand-up time." In practice, driver side and passenger side airbag cushions are typically desirably designed to begin deflating almost instantaneously upon deployment such as to avoid presenting an undesirably hard or ungiving surface to an oppositely situated vehicle occupant. However, airbag cushions which provide substantially longer stand-up times may be required or desired in the event of certain accidents or collisions in order to provide a suitable desired level of occupant protection. For example, one particularly troublesome form of side impact is commonly referred to as a "roll-over." In a roll-over incident, a vehicle may undergo a partial, complete or multiple roll-over. As will be appreciated by those skilled in the art, roll-over accidents can be particularly demanding on inflatable restraint systems. In particular, an airbag cushion designed to provide occupant protection in the event of a vehicle roll-over may be required or desired to remain pressurized for an extended or prolonged period of time, as compared to usual or typical driver side and passenger side airbag installations. For example, a roll-over protection side impact airbag cushion desirably remains pressurized or provides a stand-up time as long as about 5 seconds.

One particularly effective form of side impact inflatable restraint is the subject of HÅland et al., U.S. Pat. No. 5,788,270, issued 04 Aug. 1998, the disclosure of which patent is hereby incorporated by reference herein in its entirety and made a part hereof. Inflatable elements, such as disclosed in HÅland et al., U.S. Pat. No. 5,788,270, may desirably include an inflatable portion formed from two layers of fabric with the front layer and the back layer of the fabric woven together at selected points. In particular embodiments, such selected points are arranged in vertically extending columns and serve to divide the inflatable part into a plurality of vertical parallel chambers. The spaces between the selected points permit internal venting between adjacent chambers of the inflatable element. Particular such inflatable devices/elements, such as utilized in applications to provide protection over an extended area and having a generally planar form, are frequently referred to as "inflatable curtains."

A one piece woven construction has been found to be a particularly effective method of forming such inflatable element airbag cushions. In particular, one piece woven constructions have been found to provide a relatively low cost method of constructing suitable such airbag cushions which provide desired stand-up times. While inflatable element airbag cushions can, as is known in the art, be fabricated of various materials, nylon 6,6 has been found to be a particularly effective and useful material for use in the making or manufacture of inflatable curtain elements such as described above and having a one piece woven design.

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Many types or forms of inflator devices have been disclosed in the art for use in inflating an inflatable restraint system airbag cushion.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material. While various combustible pyrotechnic materials are available, gas generant compositions commonly utilized in the inflation of automotive inflatable restraint airbag cushions have previously most typically employed or been based on sodium azide.

The gas generated by the combustion of such pyrotechnic materials can be very hot and may contain variously sized particulate material. In practice, it is relatively common to include within such inflator devices a filter or the like effective to remove such particulate and to reduce the temperature of the gas prior to discharge therefrom. Nevertheless, gas discharge temperatures in the range of about 1300 K are common for conventional pyrotechnic inflator devices. In view thereof, it is common to include within an associated airbag cushion a heat resistant coating or one or more strategically placed patches of heat resistant material such as to minimize or avoid direct contact of the hot inflator discharge onto unprotected airbag cushion material.

Further, pyrotechnic inflators, such as used for the inflation of passenger side airbag cushions, are commonly cylindrical in shape and typically have a length to diameter ratio (also commonly referred to as "L/D ratio") in the range of about 7. In practice, the L/D ratios of such inflator devices have been limited or restricted by the general need or desire to ensure relative uniformity in ignitability over the length of the inflator device. In particular, it has proven difficult to attain ignition of an extended length of pyrotechnic gas generant material in a uniform manner while in an assembly of small diameter.

Another common form or type of inflator device utilizes or relies on a stored compressed gas. Upon actuation, such devices release the stored gas into an associated airbag cushion to effect the inflation thereof. While such inflator devices may reduce or avoid problems relating to particulate and hot gas discharges, such inflators generally require the potentially long-term storage of a material under pressure. As will be appreciated, such long-term pressure storage can raise concerns regarding undesirable leakage over the course of the relatively long design lifetimes of such systems once installed in vehicles.

Yet another common form or type of inflator device utilizes or relies on a combination of stored compressed gas and combustion of a gas generating material, e.g., a pyrotechnic, to produce or form an inflation gas for an associated airbag cushion. Such an inflator device is commonly referred to as an augmented gas or hybrid inflator. As with the above-identified pyrotechnic inflators, such inflator devices may result in a gas having an undesirably large or high particulate content. Also, while the discharge from such a hybrid inflator device is generally at a reduced temperature as compared to a corresponding pyrotechnic inflator, the temperature of such discharge may still be undesirably high for certain applications. Further, such inflator devices may suffer from at least some of the possible complications and related concerns regarding the potentially long term storage of a material under pressure.

In view of the extensive familiarity and experience with hot gas-producing inflator devices such as pyrotechnic-based inflators, there has been a desire to apply or utilize pyrotechnic-based inflator devices in association with side impact inflatable restraints. Unfortunately, is not always easy or practical to compensate for the elevated temperature discharges typically associated with pyrotechnic-based inflator devices via the inclusion of a heat resistant coating or one or more patches of heat resistant material within an associated side impact inflatable cushion element. For example, such inclusion almost invariably results in the side impact cushion, when folded such as in a stored condition, being more bulky than is generally desired. Moreover, inflatable restraints such as inflatable curtains which are commonly designed to provide protection over an extended area typically need to be rapidly inflated over relatively extended lengths, as compared to common front impact inflatable restraint devices. The provision of inflation gas produced by the reaction of pyrotechnic gas generant materials along extended lengths in a desirably uniform and rapid manner can be particularly challenging to achieve.

Thus, there is a need and a demand for inflator devices and associated assemblies and methods of use such as may more readily permit or facilitate the use of hot gas-producing inflator devices, such as pyrotechnic-based inflators, in association with inflatable devices designed to provide protection over an extended area, such as inflatable curtain inflatable devices.

SUMMARY OF THE INVENTION

A general object of the invention is to provide one or more of an improved inflator device, inflator assembly and method of inflating an inflatable device.

A more specific objective of the invention is to overcome one or more of the problems described above.

The general object of the invention can be attained, at least in part, through an inflator which includes an elongated hollow tubular member which contains an elongated supply of pyrotechnic gas generant material reactable to produce a supply of gas. The tubular member has a length to diameter ratio greater than 20 and includes a plurality of longitudinally-spaced apart gas exit orifices wherethrough at least a portion of the supply of gas provided by reaction of the pyrotechnic gas generant material can be expelled from the tubular member.

The invention further comprehends an inflation assembly. In accordance with one preferred embodiment of the invention, such an inflation assembly includes an elongated inflator adapted to provide to provide a gas-containing discharge through selected locations spaced along the length of the inflator. The inflation assembly also includes an elongated discharge treatment element secured with the inflator at selected positions along the respective lengths of the inflator and the discharge treatment element. The discharge treatment element is effective to treat at least a portion of the gas discharged from the inflator contacting thereagainst and to deform to create spaced apart gas flow paths between the inflator and the treatment element, with the gas flow paths spaced apart along the respective lengths of the inflator and the treatment element. The inflation assembly further includes an inflatable curtain airbag cushion in inflation fluid communication with the inflator.

The invention still further comprehends a method of inflating an inflatable device. In accordance with one preferred embodiment of the invention, such method includes reacting an elongated supply of pyrotechnic gas generant material within an elongated hollow tubular member of an inflator having a length to diameter ratio greater than 20 to produce a supply of gas along the length of the tubular member. The method then involves expelling at least a portion of the supply of gas through selected locations spaced along the length of the inflator.

The prior art has generally failed to provide a pyrotechnic inflator or corresponding inflation assembly which furnishes inflation gas, either or both, in as timely a manner or distributed over as an extended length, as may be desired, for certain applications such as in the inflation of inflatable curtain inflatable elements.

As used herein, references to "pyrotechnic" or "pyrotechnic-based" inflators and the like are to be understood to refer to those inflator devices which principally rely on the reaction of a pyrotechnic material to produce an inflation fluid, typically in the form of a gas, for use in the inflation of an associated inflatable device. As will be appreciated, as used herein the broader use of the term "pyrotechnic-based" inflator encompasses both inflators which rely primarily on reaction of a pyrotechnic material to generate or form a desired inflation fluid as well as those inflator devices, such as commonly referred to as "hybrid inflators," which utilize a pyrotechnic material to heat or supplement a stored pressurized gas.

References herein to "side impact" inflatable restraint systems, assemblies and the like are to be understood to generally encompass such systems, assemblies and such as adapted to provide vehicle occupant protection in the event of a side impact such as by providing one or more of roll-over protection (such as via an inflatable curtain inflation device), head/thorax protection (such as via a head/thorax side impact inflation device) and thorax protection (such as via a thorax side impact inflation device).

Other objects and advantages will be apparent to those skilled in the art from the following detailed description taken in conjunction with the appended claims and drawings.

BRIEF DESCRIPTION OF THE DRAWINGS

FIG. 2 is a fragmentary side cross sectional view of the inflation assembly shown in FIG. 1.

FIG. 3 is a view taken substantially along the line 3—3 of FIG. 2 and viewed in the direction of the arrows.

FIG. 4 is a simplified end cross sectional view of an assembly, in accordance with another preferred embodiment of the invention, in a static state and including the inflation assembly shown in FIGS. 1–3.

FIG. 5 is a simplified end cross sectional view of the assembly shown in FIG. 4 but now shown in an activated state.

FIG. 8, similar to FIG. 2, is a fragmentary side cross sectional view, but now of an inflation assembly in accordance with an alternative embodiment of the invention.

FIG. 9 is a view taken substantially along the line 9—9 of FIG. 8 and viewed in the direction of the arrows.

DETAILED DESCRIPTION OF THE INVENTION

The present invention, as is described in more detail below, provides an improved devices, assemblies and methods such as may be used for the inflation an inflatable device such as in the form of an inflatable vehicle occupant restraint, for example. More particularly, the invention provides inflation devices, assemblies and methods of inflatable device inflation such as may provide or furnish inflation gas via the reaction of a pyrotechnic gas generant material in, either or both, a more timely a manner or more uniformly or effectively distributed over an extended length, as may be desired, for certain applications such as in the inflation of at least certain inflatable curtain inflatable elements or seat back inflatable restraint device deployment locations such as wherein the utilization or employment of elongated inflator devices may be desired.

Figure 1:
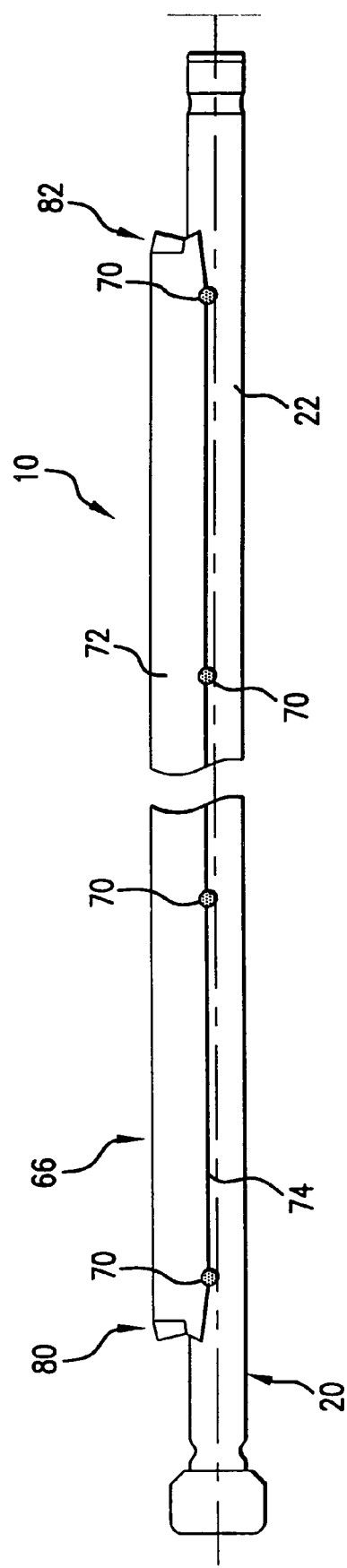
FIG. 1 is a fragmentary side plan view of an inflation assembly including an inflator device in accordance with one preferred embodiment of the invention, with the inflation assembly in a static state.

As will be appreciated, the present invention may be embodied in a variety of different structures. Referring to FIGS. 1–3, there is illustrated the present invention as embodied in a vehicle occupant safety assembly, also sometimes referred to herein as an inflation assembly, generally designated by the reference numeral 10 and such as adapted for use in association with an inflatable curtain inflatable restraint installation, as described in greater detail below. FIGS. 4 and 5 in turn illustrate an assembly, generally designated by the reference numeral 12, composed of the inflation assembly 10 in association with an inflatable device, designated by the reference numeral 14, in static and activated states, respectively.

Turning to FIGS. 1–3, the inflation assembly 10 is shown in a static state and includes an inflator device 20. The inflator 20 is formed or generally includes an elongated hollow tubular member 22. The tubular member 22 has an inner and an outer surface, 24 and 26, respectively, and forms generally opposed first and second ends, 30 and 32, respectively. The inflator 20 and, more particularly the tubular member 22 thereof, is elongated in that it desirably has a length to diameter ratio greater than or in excess of 20 such as may be desired for effective inflation of various elongated inflatable devices such as at least certain inflatable curtain inflatable devices. Further, inflators having an L/D ratio greater than 25 and greater than 30, respectively, may be desired for certain such vehicular inflatable restraint installations.

As detailed below, the large L/D ratios realizable with inflator devices in accordance with one preferred form of the invention desirably permit and facilitate assemblies wherein such inflation device is contained in whole or in part within an associated inflatable device, such as an inflatable device in the form of an inflatable curtain airbag cushion. As also detailed below, such inflators may desirably be small enough, e.g., have a small enough diameter, that the installation or placement thereof in particular locations within the interior of a vehicle, such as along the roof line of a vehicle such as above a vehicle door, is facilitated.

The tubular member 22 contains an elongated supply of pyrotechnic gas generant material, generally designated by the reference numeral 34, reactable to produce a supply of gas such as may be used in the inflation of the associated inflatable device 12, shown in FIGS. 4 and 5. In accordance with the invention, various pyrotechnic materials, such as known in the art, can be used. As will be appreciated from the further description herein contained, inflation assemblies in accordance with the invention such as the inflation assembly 10 typically have or include an internal or "free" volume which is relatively limited or small, at least compared to common or conventional pyrotechnic-based inflator devices such as employed for inflation of passenger side airbag cushions.

In accordance with one preferred embodiment of the invention and as more particularly shown in FIGS. 2 and 3, at least a portion of the supply of pyrotechnic gas generant material 34 is in the form of a plurality of cylindrical annular-shaped grains 36 axially aligned end to end along the length of the tubular member 22. The supply of pyrotechnic gas generant material, particularly when composed of a plurality such or similar grains, is relatively flexible. Such flexibility may be particularly desired or useful where, as described in greater detail below, such supply of pyrotechnic gas generant material is incorporated or included in an inflator or associated assembly having an arcuate form or profile.

The cylindrical annular-shaped grains 36 may, as shown, form or include an internal cavity 38 with such shaped grains forming an inner surface 40 and an outer surface 42. In accordance with one preferred embodiment of the invention, such inner surface 40 can desirably be at least partially coated with an ignition enhancing material 44, such as known in the art, to improve or enhance the ignitability of the gas generant material and such as may desirably serve to improve or better ensure the rapid propagation of reaction initiation along the length of the inflator 20.

The inflator tubular member 22 also includes a plurality of longitudinally-spaced apart gas exit orifices 46 wherethrough at least a portion of the supply of gas provided by reaction of the pyrotechnic gas generant material 34 can be expelled from the tubular member 22 and, as described in greater detail below, directed to the associated inflatable device 12, shown in FIGS. 4 and 5. In accordance with a preferred embodiment of the invention, the gas exit orifices 46 are desirably shaped and sized to effectively throttle the combustion process.

As shown in FIGS. 2 and 3, the inflator 20 further includes, within the tubular member 22 and surrounding at least a portion of the supply of pyrotechnic gas generant material 34, a containment member 50. Such a containment member 50 desirably permits diffusion therethrough of the gas generated upon ignition of the gas generant material 34 such as to permit the fluid communication or passage of the such gas therethrough. Such a gas diffusible containment member 50 can be variously constructed such as will be apparent to those skilled in the art and guided by the teachings herein provided. In accordance with one preferred embodiment of the invention, such a containment member 50 is desirably formed or constructed of an expanded metal such as described in commonly assigned Armstrong, III et al., U.S. Pat. No. 5,551,724, issued 3 Sep. 1996, the disclosure of which is hereby incorporated by reference in its entirety. Particular expanded metal materials useful in the practice of the invention may, such as because of the temperatures associated with operation of such assemblies, include materials such steel or stainless steel, for example. It will be understood, however, that other gas diffusible containment materials may, if desired be used. In particular, a gas diffusible containment member formed or fabricated of various mesh or mesh type materials, can, if desired, be used. For example, such a gas diffusible containment member can be formed or made of a suitable woven metal or non-metal mesh.

As will be appreciated, the containment member 50 may desirably serve to retain therewithin ash remaining upon combustion of the gas generant material 34. The containment member 50, in addition to providing a plenum for the gases produced upon combustion of the gas generant material 34, may also desirably serve to cool such gases which are passed therethrough.

If desired and as shown, the inflator 20 may still further include a releasable barrier breakout foil 52 such as applied along the tubular member inner surface 24 adjacent the exit orifices 46. If used, such breakout foil is desirably composed of a material compatible with the gas generant material contained within the inflator such as to avoid unnecessary or undesired reactions therewith. Thus, dependent on the gas generant composition employed, breakout foils composed of materials such as copper or brass, for example, may be used.

The inclusion of a breakout foil or other effective releasable barrier form or member may be variously desired such as to prevent undesired material communication through the exit orifices 46. For example, in the case of use of a moisture sensitive gas generant material, the inclusion of a breakout foil or the like may be desired to prevent moisture from passing through the orifices into communication with the gas generant material. Alternatively or in addition, the inclusion of a breakout foil or the like may be desired to permit the build-up of a desired pressure within the tube such as may be required or desired to better ensure ignition of particular gas generant materials, as is known in the art.

It will be appreciated, the such breakout foil or other releasable barrier form or member can be variously applied, as may be desired, such as along tubular member inner surface 24 or outer surface 26, adjacent the exit orifices 46 or even partially or completely temporarily filling selected or all of the associated the exit orifices 46.

The inflator 20 and, more specifically, the tubular member 22, also contains, includes or houses an initiator 54, such as known in the art and actuatable to effect ignition of the gas generant material 34. The initiator 54 can without necessary limitation desirably be secured within the tubular member 22 by various means such as by way of a roll crimp 56 at or near the tubular member first end 30.

The inflator 20 also includes an end plug 60 at the tubular member second end 32. Such an end plug 60 can similarly also without necessary limitation be desirably secured within the tubular member 22 by various means such as by way of a roll crimp 62 at or near the tubular member second end 32.

The inflation assembly 10 also includes a discharge treatment element 66 such as secured adjacent the inflator 12, such as at selected location or portions along the respective lengths of the inflator 12 and the discharge treatment element 66 such as by means of a plurality of welds 70. It is to be understood, however, that other appropriate means or forms of attachment can, if desired be used. For example, in alternative embodiments of the invention, a series of two or more spaced apart straps may, if desired, be employed to secure a discharge element to an associated inflator device.

In accordance with one preferred embodiment of the invention and as shown, the discharge treatment element 66 is desirably situated opposite the gas exit orifices 46. In the illustrated embodiment, the discharge treatment element 66 includes or forms a diffuser device 72 and such as may be desired or useful in directing at least a portion of gas expelled from the inflator 20 into an associated inflatable device.

In addition, if desired and as shown, the inflation assembly 10 may also include a filter element 73 interposed between the inflator 20 and the discharge treatment element 66. As will be appreciated, the inclusion of such a filter element or particulate trap can desirably serve as or provide a surface whereat or onto which condensable gas generant reaction products can be purposely condensed and thus avoid being undesirably condensed further downstream.

Those skilled in the art will appreciate that such a filter element 73 can be variously constructed in accordance with particular desired embodiments of the invention. For example, in accordance with certain preferred embodiments of the invention, filter elements 73 for use in the practice of the invention can be fabricated or formed of a mesh or a mesh-like material such as composed of expanded metal materials (e.g., such steel or stainless steel) such as described above relative to the containment member 50.

As described in greater detail below, the discharge treatment element 66 can desirably be designed to appropriately deform upon proper assembly actuation. More particularly, the discharge treatment element 66 and the diffuser device 72 formed by or included therewith may desirably be of an elongated form such as to generally correspond to the associated inflator 20. The discharge treatment element 66 and the diffuser device 72 formed by or included therewith includes first and second longitudinal ends, 74 and 76, respectively, and first and second generally opposed lateral ends, 80 and 82, respectively.

If desired, the lateral ends of such a discharge treatment element and/or a diffuser device may be formed or otherwise appropriately shaped to prevent or otherwise restrict the flow of gas therethrough. For example, in the illustrated embodiment shown in FIGS. 1 and 2, the lateral ends 80 and 82 of the discharge treatment element 66 and the diffuser device 72 have been pinched to prevent such flow thereat.

The diffuser device longitudinal ends 74 and 76 are generally free (i.e., unattached) and, in the static state shown in FIGS. 1–4, disposed adjacent such as in touching or contacting proximity to the tubular member outer surface 26. Thus, upon the initial passage of inflation gas out of the inflator 20, the diffuser device 72 as shown in FIG. 4 serves or acts to prevent, hinder or otherwise block such initial flow of inflation gas from the inflator 20 into the inflatable device 14. However, with the build-up of sufficient gas pressure against the discharge treatment element 66 and the diffuser device 72, the discharge treatment element 66 and the diffuser device 72 deforms, such as shown in the activated state illustrated in FIG. 5, to create spaced apart gas flow paths 84 and 86 between the inflator 20 and the treatment element 66. In particular, the generally free (i.e., unattached) diffuser device longitudinal ends 74 and 76 deflect or deform away from the tubular member outer surface 26, in particular in the regions spaced between the adjacent welds 70, to subsequently create or form the spaced apart gas flow paths 84 and 86, respectively.

As a result, inflation assemblies in accordance with the invention can desirably provide or result in a relatively gentle onset of gas flow, such as may be desired in particular installation applications as those skilled in the art and guided by the teachings herein provided will appreciate. Moreover, the discharge treatment element 66 and the diffuser device 72 formed by or included therewith can thereby effectively serve to either or both redirect and diffuse the inflation gas exiting from the gas exit orifices 46 such that the heat commonly associated with such exothermic reaction product inflation gas may avoid either or both undesired concentration and direction onto an associated inflatable device.

Such discharge treatment element and diffuser device can be various constructed or formed. In one preferred embodiment of the invention, such a discharge treatment element and diffuser device is simply formed or fabricated of a folded or bent metal, such as sheet metal steel, for example. As will be appreciated, incorporation or use of such a discharge treatment element and diffuser device of thicker cross-section or otherwise more resilient to bending or deformation will generally result in an assembly the produces or results in a more gentle or gradual of onset of inflation of the associated inflatable device.

Figure 6:
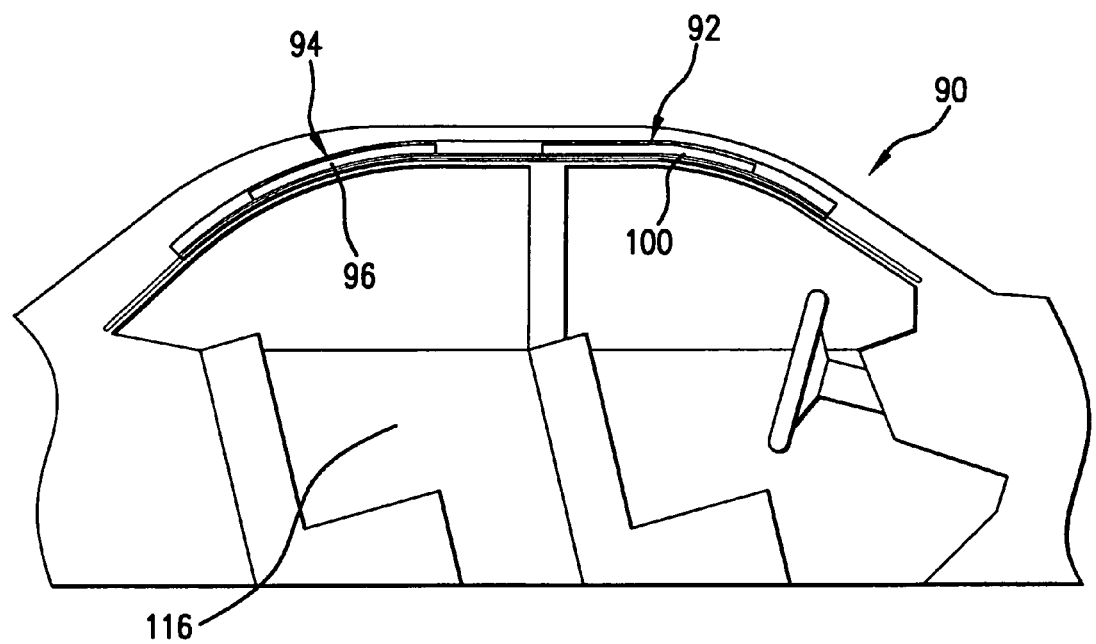
FIG. 6 is a simplified fragmentary schematic of an interior portion of a motor vehicle containing first and second inflation assemblies, in accordance with the invention, in a static state.

Turning now to FIG. 6, there is illustrated a simplified fragmentary schematic of an interior portion of a motor vehicle 90 which contains first and second assemblies, 92 and 94, respectively, in accordance with the invention and similar to the assembly 12 described above, in a static state. As shown, each of the assemblies 92 and 94, particularly the respective tubular member thereof, may advantageously be arcuate such as by the incorporation of one or more bends, such as the bend 96 shown for the assembly 94, and the bend 100 shown for the assembly 92.

While bends of various radius can be incorporated in assemblies in accordance with the invention, it is believed that it is generally desirable to limit such bends to a two-foot radius in order to avoid detrimentally impacting inflator performance. As will be appreciated by those skilled in the art and guided by the teachings herein provided, the inclusion or incorporation of bends can desirably permit assemblies in accordance with the invention to more easily or better conform to a particular vehicle installation location, such as along the vehicle roof line or along a nonlinear part of a corresponding or associated vehicle door frame.

In accordance with the broader practice of the invention, such arcuate form may be imparted to the tubular member either before or after the supply of pyrotechnic gas generant material has been loaded therein. In practice, however, the loading of the supply of pyrotechnic into a relatively straight or an unbent tube may be preferred as such loading can be simpler and serve to facilitate mass production as such pyrotechnic-loaded tubes can be subsequently shaped in various particularly desired shapes and forms.

Figure 7:
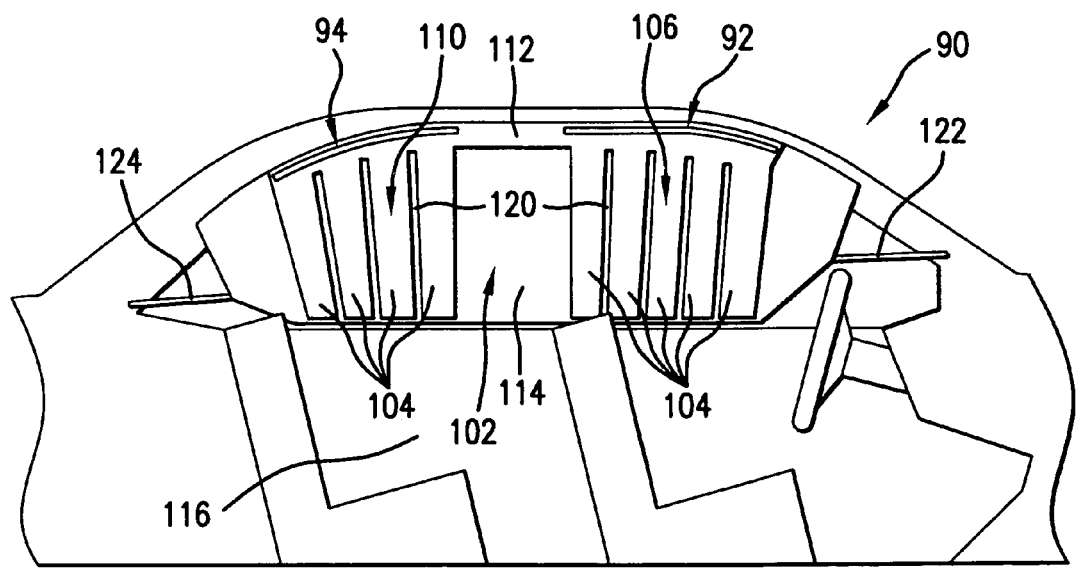
FIG. 7 is a simplified fragmentary schematic of an interior portion of a motor vehicle generally corresponding to FIG. 6 and containing first and second inflation assemblies, in accordance with the invention, but now shown in an activated state.

FIG. 7 is a simplified fragmentary schematic of the interior portion of the motor vehicle 90, shown in FIG. 6 and described above, but now with the first and second assemblies, 92 and 94, shown in an activated state. As shown, the assemblies 92 and 94 share a common inflatable device 102 in the general form or configuration of an inflatable curtain airbag cushion, in accordance with one preferred embodiment of the invention.

While inflatable curtain airbag cushions for use in the practice of the invention can be variously constructed or fabricated, the invention is believed to have particular perceived utility in conjunction with inflatable curtain airbag cushions such as of the type identified above and described in the above-referenced HÅland et al., U.S. Pat. No. 5,788, 270. In accordance therewith, the inflatable curtain inflatable device 102 incorporates a plurality of parallel substantially vertical, substantially cylindrical cells 104 forming a front seat-adjacent inflatable section 106 and a rear seat-adjacent inflatable section 110 joined together by a connecting inflatable section 112, such as to better equalize the inflation forces in the front and rear section 106 and 100, and a connecting uninflated section 114. The inflatable device 102 may be made of interwoven fabric. Such a fabric comprises a first layer that defines the front part or region of the inflatable device 102 (e.g., the part of the inflatable device 102 that is visible in FIG. 7) and a second layer that defines the back part or region of the inflatable device 102 (e.g., the part of the inflatable device 102 that is adjacent the vehicle door side 116 in FIG. 7). Selected areas of the first and second regions in turn are interwoven to define links in the form of points or lines 120 where the front part and the back part of the inflatable element are secured together. A technique for making an inflatable element of interwoven fabric is described in more detail in International Patent Publication WO 90/09295.

The inflatable device 102 also includes a first or forward webbing strap 122 and a second or rearward webbing strap 124 such as permits the inflatable device 102 to desirably extend across the vehicle side 116 when in an activated inflated state, as shown in FIG. 7 and such as may desired to provide desired occupant protection.

While the invention has been described above with reference to an inflation assembly embodiment (herein designated by the reference numeral 10) which employs or incorporates an ignition enhancing coating applied onto the gas generant material, it is to be understood that the broader practice of the invention is not necessarily so limited. For example, FIGS. 8 and 9 illustrate an inflation assembly, generally designated by the reference numeral 10', in accordance with an alternative embodiment of the invention. The inflation assembly 10' is generally similar to the inflation assembly 10 described above. In particular, the inflation assembly 10' similarly includes an elongated inflator device 20' with a discharge treatment element 66' secured adjacent thereto. The inflator device 20' includes an elongated hollow tubular member 22', as described above. The tubular member 22' has an inner and an outer surface, 24' and 26', respectively, and forms generally opposed first and second ends, 30' and 32', respectively.

The tubular member 22' also contains an elongated supply of pyrotechnic gas generant material, generally designated by the reference numeral 34' and reactable to produce a supply of gas such as may be used in the inflation of an associated inflatable device. The gas generant material 34', similar to the gas generant material 34 described above, is in the form of a plurality of cylindrical annular-shaped grains 36' axially aligned end to end along the length of the tubular member 22'. The cylindrical annular-shaped grains 36' form or include an internal cavity 38' with such shaped grains forming an inner surface 40' and an outer surface 42'. The inflation assembly 10', however, differs primarily from the inflation assembly 10 in that rather than coating of an ignition enhancing material, the gas generant grains 36' contain an elongated ignition article 45' extending within the internal cavity 38' included of formed thereby.

As will be appreciated by those skilled in the art and guided by the teachings herein provided, various elongated ignition articles such as known in the art can be incorporated into particular inflation assemblies in accordance with the invention to assist and help ensure the desired rapid propagation of ignition along the extended lengths of inflation assemblies in accordance with particular preferred embodiments of the invention. Further, through the inclusion and use of rapid ignition propagation enhancements such as such ignition enhanced materials, ignition articles or the like, inflation assemblies in accordance with the invention can desirably achieve or realize the rapid ignition of an associated supply of gas generant along the extended length of the inflator device without requiring the inclusion of comparatively bulky or weighty ignition tubes, as is common in the prior art.

Further, while the invention has been described above relative to inflation assemblies which include a discharge treatment element in association with a corresponding inflator device, the broader practice of the invention is not necessarily so limited. For example, if desired, elongated inflator devices as described herein can be used in association with inflatable devices without the incorporated of a discharge treatment element. Where so used, however, the resulting inflation assembly may need to incorporate some other effective means to prevent or avoid direct or other undesired impingement of pyrotechnic gas generant material reaction products onto the inflatable device.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

An elongated inflator, similar to the inflator 20 described above, was used. In particular, this test inflator device had a length of 520 mm, a diameter of 11 mm and include a tubular member which contained a suitable gas generant material in the form of cylindrical annular-shaped grains and which grains had an inner surface coated with a suitable ignition enhancing material, as described above.

The test inflator device was mated to a 60-liter steel tank equipped with a pressure measuring port and a gas sampling port. The test inflator device was also provided with a series of pressure transducers spaced along the length of the inflator tubular member. In particular, these pressure transducer were located at points a, b, and c, which points were located at distances of a) 25 mm, b) 215 mm, and c) 405, respectively, from the initiator.

Tank pressure vs. time performance as well as combustion chamber pressure (i.e., pressure within the tubular member) at points a, b and c, respectively, was recorded by means of a pressure transducer and data collection system.

Figure 10:
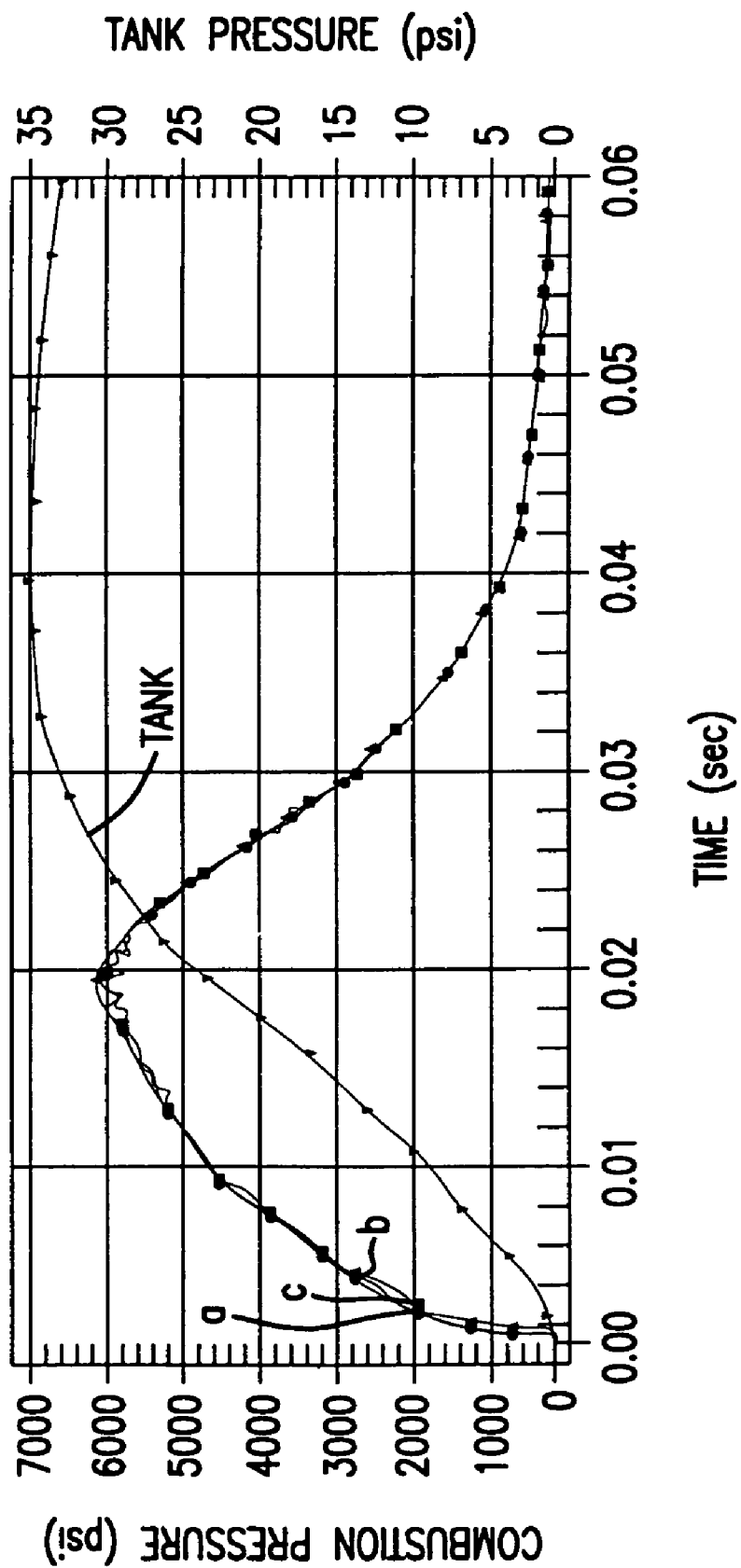
FIGS. 10 and 11 are graphical depictions of the tank pressure and combustion chamber pressure at selected locations, respectively, as a function of time performance realized in the Example, wherein FIG. 11 employs an expanded scale time axis.
Figure 11:
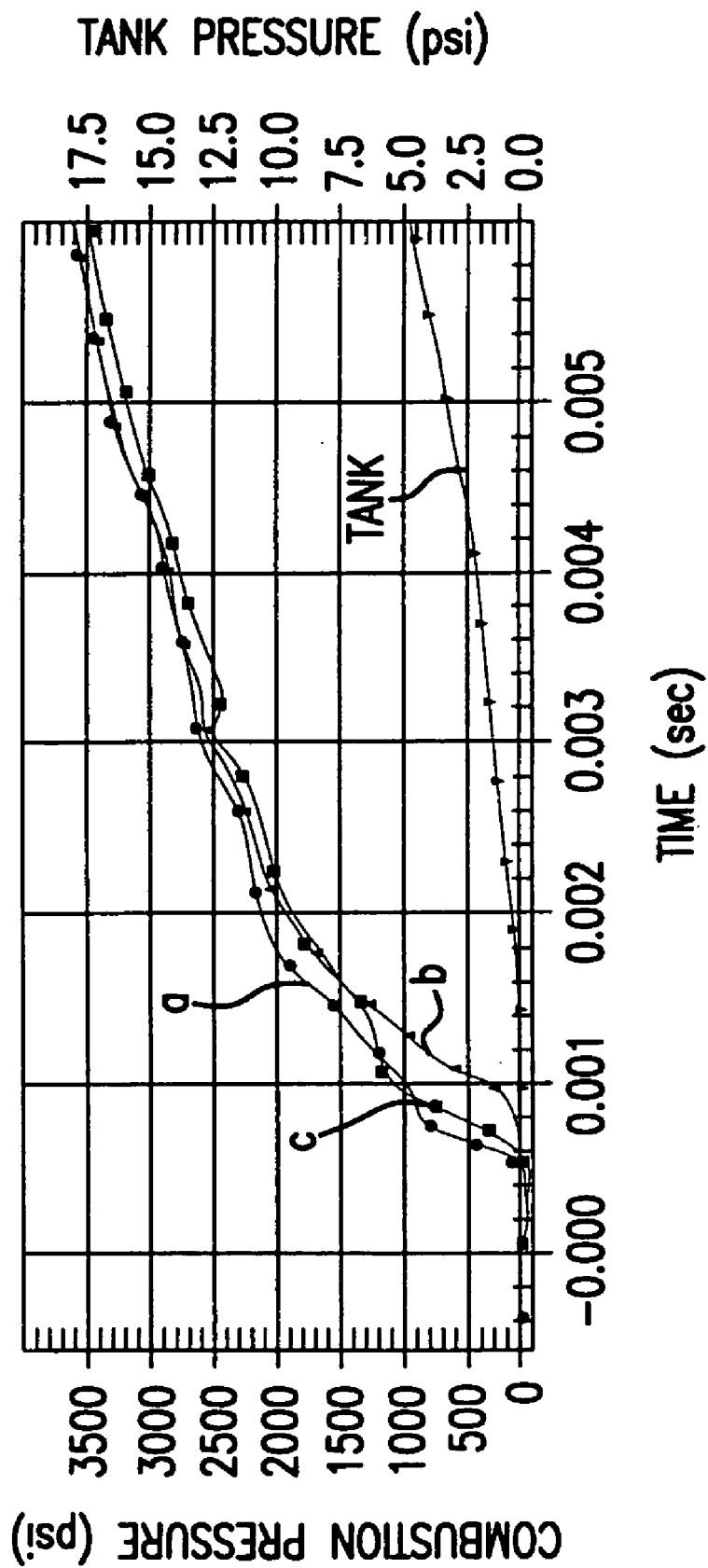

The performance realized with the test inflator device is illustrated in by FIGS. 10 and 11. More particularly, FIGS. 10 and 11 are graphical depictions of tank pressure and combustion chamber pressure at points a, b and c, as a function of time subsequent to inflator actuation.

As shown in FIGS. 10 and 11, the test inflator provided near simultaneous combustion chamber pressure readings along the extended length of the inflator thus demonstrating that an inflator device in accordance with the invention is able to quickly ignite along the extended length thereof.

In view of the above, it is to be appreciated that the invention provides a pyrotechnic inflator and corresponding inflation assembly such as furnishes or supplies inflation gas, either or both, in a timely manner and distributed over an extended length, as may be desired, for certain applications such as in the inflation of inflatable curtain inflatable elements. In particular, the invention provides such devices, assemblies and methods of inflation wherein an elongated supply of pyrotechnic gas generant material, such as in a form having a length to diameter ratio greater than 20, can be used to produce a supply of inflation gas such as may be especially desired for particular inflatable restraint installations such as in association with certain inflatable curtain airbag cushion, for example.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflation assembly comprising:
   an inflator comprising an elongated hollow tubular member containing an elongated supply of pyrotechnic gas generant material reactable to produce a supply of gas, the tubular member having a length to diameter ratio greater than 20 and including a plurality of longitudinally-spaced apart gas exit orifices wherethrough at least a portion of the supply of gas provided by reaction of the pyrotechnic gas generant material can be expelled from the tubular member and
   an elongated discharge treatment element having a length and secured with the tubular member at selected positions along the length of the tubular member, the discharge treatment element effective to treat at least a portion of the gas expelled from the tubular member contacting thereagainst and to deform to create spaced apart gas flow paths between the tubular member and the treatment element, the gas flow paths spaced apart along the length of the tubular member and the length of the treatment element, the treatment element also directing at least a portion of gas expelled from the tubular member into an associated inflatable device.

2. The inflation assembly of claim 1 wherein at least a portion of the supply of pyrotechnic gas generant material comprises a plurality of cylindrical annular-shaped grains axially aligned end to end along the length of the tubular member.

3. The inflation assembly of claim 2 wherein the cylindrical annular-shaped grains comprise an inner surface at least partially coated with an ignition enhancing material.

4. The inflation assembly of claim 2 wherein the cylindrical annular-shaped grains form an internal cavity longitudinally extending substantially through the supply of pyrotechnic gas generant material, the inflator additionally comprising an elongated ignition article extending within the internal cavity.

5. The inflation assembly of claim 1 additionally comprising a gas diffusible containment member within the elongated hollow tubular member and directly adjacently surrounding at least a portion of the supply of pyrotechnic gas generant material.

6. The inflation assembly of claim 5 wherein the gas diffusible containment member comprises an expanded metal.

7. The inflation assembly of claim 1 additionally comprising an associated inflatable device wherein the associated inflatable device comprises an inflatable curtain airbag cushion.

8. The inflation assembly of claim 7 wherein the elongated hollow tubular member is arcuate.

9. The inflation assembly of claim 1 additionally comprising a filter element interposed between the inflator and the discharge treatment element.

10. The inflation assembly of claim 1 additionally comprising an associated inflatable curtain airbag cushion inflatable device in inflation fluid communication with the inflator.

11. The inflation assembly of claim 1 wherein the elongated hollow tubular member is arcuate.

12. An inflator comprising:
an elongated hollow tubular member containing an elongated supply of pyrotechnic gas generant material reactable to produce a supply of gas, the tubular member having a length to diameter ratio greater than 20 and including a plurality of longitudinally-spaced apart gas exit orifices wherethrough at least a portion of the supply of gas provided by reaction of the pyrotechnic gas generant material can be expelled from the tubular member,
wherein the elongated hollow tubular member is arcuate.

13. An inflation assembly comprising:
an inflator comprising an elongated hollow tubular member containing an elongated supply of pyrotechnic gas generant material reactable to produce a supply of gas, the tubular member having a length to diameter ratio greater than 20 and including a plurality of longitudinally-spaced apart gas exit orifices wherethrough at least a portion of the supply of gas provided by reaction of the pyrotechnic gas generant material can be expelled from the tubular member and
an elongated diffuser device secured adjacent the inflator for directing at least a portion of gas expelled from the inflator into an associated inflatable device, the elongated diffuser device having first and second opposed lateral ends and also having first and second longitudinal ends.

14. The inflation assembly of claim 13 additionally comprising an associated inflatable device in inflation fluid communication with the inflator, wherein inflatable device comprises an inflatable curtain airbag cushion.

15. The inflation assembly of claim 13 wherein the elongated diffuser device and the inflator are secured together at at least one location between the first and second lateral ends of the elongated diffuser device.

16. An inflation assembly comprising:
an elongated inflator having a length, the elongated inflator adapted to provide a gas-containing discharge through selected locations spaced along the length of the inflator;
an elongated discharge treatment element secured with the inflator at selected positions along the length of the inflator and the length of the discharge treatment element, respectively, the discharge treatment element effective to treat at least a portion of the gas discharged from the inflator contacting thereagainst and to deform to create spaced apart gas flow paths between the inflator and the treatment element, the gas flow paths spaced apart along the length of the inflator and the length of the treatment element, respectively; and
an inflatable curtain airbag cushion in inflation fluid communication with the inflator.

17. The inflation assembly of claim 16 wherein the inflator comprises an elongated hollow tubular member containing an elongated supply of pyrotechnic gas generant material reactable to produce a supply of gas.

18. The inflation assembly of claim 17 wherein the elongated hollow tubular member is arcuate.

19. The inflation assembly of claim 16 wherein the inflator is contained within the inflatable curtain airbag cushion.

20. A method of inflating an inflatable device, the method comprising:
reacting an elongated supply of pyrotechnic gas generant material within an elongated hollow tubular member of an inflator having a length to diameter ratio greater than 20 to produce a supply of gas along the length of the tubular member, and
expelling at least a portion of the supply of gas through selected locations spaced along the length of the inflator,
wherein, subsequent to expulsion from the tubular member, the method additionally comprises:
treating at least a portion of supply of expelled gas to form a treated gas, the treating step including,
contacting expelled gas onto an elongated treatment element adjacent the inflator and
deforming the treatment element to create spaced apart gas flow paths between the inflator and the treatment element, the gas flow paths spaced apart along the respective lengths of the inflator and the treatment element; and
directing the treated gas through the spaced apart gas flow paths into the inflatable device.

21. The method of claim 20 wherein the elongated supply of pyrotechnic gas generant material reacts substantially simultaneously.

22. The method of claim 20 wherein the treated gas is directed through the spaced apart gas flow paths into an inflatable curtain airbag cushion inflatable device.

23. A method of inflating an inflatable device, the method comprising:

reacting an elongated supply of pyrotechnic gas generant material within an elongated hollow tubular member of an inflator having a length to diameter ratio greater than 20 to produce a supply of gas along the length of the tubular member, and expelling at least a portion of the supply of gas through selected locations spaced along the length of the inflator, wherein, prior to reaction of the pyrotechnic gas generant material, the hollow tubular member is bent to conform to an associated inflator-accepting site in an automotive vehicle in which the inflator is placed.

24. The method of claim 23 wherein the elongated supply of pyrotechnic gas generant material reacts substantially simultaneously.

25. An inflation assembly of comprising:

an inflator comprising an elongated hollow tubular member containing an elongated supply of pyrotechnic gas generant material reactable to produce a supply of gas, the tubular member having a length to diameter ratio greater than 20 and including a plurality of longitudinally-spaced apart gas exit orifices wherethrough at least a portion of the supply of gas provided by reaction of the pyrotechnic gas generant material can be expelled from the tubular member and an elongated discharge treatment element having a length and secured with the tubular member at selected positions along the length of the tubular member, the discharge treatment element effective to treat at least a portion of the gas expelled from the tubular member contacting thereagainst and to deform to create spaced apart gas flow paths between the tubular member and the treatment element, the gas flow paths spaced apart along the length of the tubular member and the length of the treatment element, the treatment element also directing at least a portion of gas expelled from the tubular member into an associated inflatable device, wherein the discharge treatment element has first and second opposed lateral ends and also has first and second longitudinal ends.

26. A method of inflating an inflatable device, the method comprising:

reacting an elongated supply of pyrotechnic gas generant material within an elongated hollow tubular member of an inflator having a length to diameter ratio greater than 20 to produce a supply of gas along the length of the tubular member, and expelling at least a portion of the supply of gas through selected locations spaced along the length of the inflator, wherein, subsequent to expulsion from the tubular member, the method additionally comprises:

treating at least a portion of supply of expelled gas to form a treated gas, the treating step including, contacting expelled gas onto an elongated discharge treatment element adjacent the inflator and deforming the discharge treatment element to create spaced apart gas flow paths between the inflator and the treatment element, the gas flow paths spaced apart along the respective lengths of the inflator and the treatment element, and directing the treated gas through the spaced apart gas flow paths into the inflatable device, wherein the discharge treatment element has first and second opposed lateral ends and also has first and second longitudinal ends and wherein:

in a static state, the first and second longitudinal ends of the discharge treatment element contact the tubular member, and upon activation, the first and second longitudinal ends of the discharge treatment element deform away from the tubular member to form spaced apart gas flow paths extending: 1) between the tubular member and each of the first and second longitudinal ends of the discharge treatment element, and 2) into the inflatable device.

* * * * *